United States Patent
Huener et al.

[11] 3,740,717
[45] June 19, 1973

[54] LIQUID CRYSTAL DISPLAY

[75] Inventors: Robert Charles Huener, Bound Brook; Stanley Joseph Niemiec, Somerville; David Keith Morgan, Fleming, all of N.J.

[73] Assignee: RCA Corporation, Princeton, N.J.

[22] Filed: Dec. 16, 1971

[21] Appl. No.: 208,813

[52] U.S. Cl. ..... 340/166 EL, 340/336, 350/160 LC
[51] Int. Cl. ........ G08b 5/36, G02f 1/28, H04q 1/00
[58] Field of Search............... 340/166, 324 R, 336; 350/160 LC

[56] References Cited
UNITED STATES PATENTS

| | | | |
|---|---|---|---|
| 3,622,996 | 11/1971 | Bath | 340/336 X |
| 3,647,958 | 3/1972 | Sobel | 340/166 EL |
| 3,654,606 | 4/1972 | Marlowe | 340/166 EL |
| 3,653,745 | 4/1972 | Mao | 350/160 R |

*Primary Examiner*—Donald J. Yusko
*Attorney*—H. Christoffersen

[57] ABSTRACT

Multiplexed operation of a plurality of liquid crystal numeric indicators is achieved by applying a unipolarity, alternating exciting voltage to the backplate of a selected indicator, applying to all other backplates a unipolarity alternating voltage in a frequency range above that at which light scattering occurs, and applying to each segment of all indicators a unipolarity alternating exciting voltage which may be either in phase with or 180° out-of-phase with the exciting voltage applied to the backplate of the selected indicator.

12 Claims, 4 Drawing Figures

LIQUID CRYSTAL DISPLAY

BACKGROUND OF THE INVENTION

Wide interest has been shown in recent years in the use of liquid crystal, such as that of the nematic type operating on the principle of dynamic scattering, for display purposes such as television type displays, bar graphs, numeric indicators and so on. It is now well understood in the art that in these and other applications the life of the liquid crystal is greatly increased when the voltages employed for excitation and erasure are alternating voltages and the resulting average value of direct current through the liquid crystal is zero.

In many applications the only voltage conveniently available for driving the liquid crystal is either a direct voltage or a unipolarity alternating voltage, that is, one which varies in value between say zero and some positive level or zero and some negative level. Put another way, in many situations the alternating voltage which is available has a direct current component other than zero and this direct current adversely affects the life of the liquid crystal. Typical examples of environments of this type occur in timing systems which employ logic circuits as, for example, in portable calculators, wrist watches and so on. In these types of systems, the primary power supply may be a battery and the alternating voltage produced by the logic circuits varies in amplitude between a level such as ground, representing binary zero, and a level such as +15 volts representing binary 1, as one example.

In systems such as discussed briefly above, there are also space and wiring problems as well as logic circuit complexity problems. With respect to space and wiring, the liquid crystal numeric indicators, for example, occupy only a relatively small volume and there is difficulty connecting the leads from the various segments to the logic circuits. Here it would be desirable, if possible, to reduce to a minimum the number of leads coming from the liquid crystal indicators. With respect to logic circuits, it is desirable that they be relatively simple and that, if possible, the ones required to drive a single indicator be suitable, without duplication, for also driving the remaining indicators.

SUMMARY OF THE INVENTION

An alternating exciting voltage is applied to a selected row of a matrix of liquid crystal elements and voltage at the same frequency is applied also to the columns of the matrix, either in phase with or out-of-phase with the row voltage. An alternating voltage at a frequency above that at which light scattering occurs is applied to the remaining rows of the matrix.

DETAILED DESCRIPTION

Figure 1:
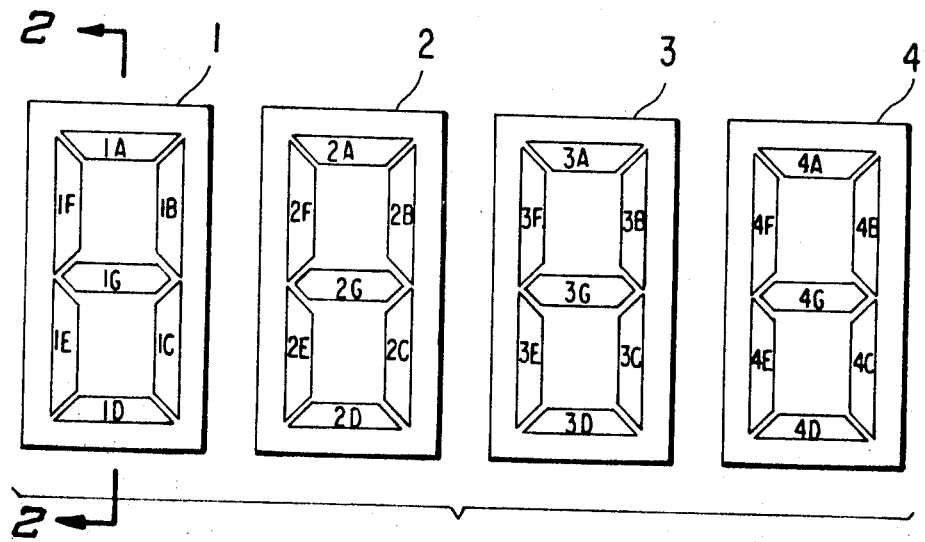
FIG. 1 is a plan view of a liquid crystal display panel containing four numeric indicators.
Figure 2:
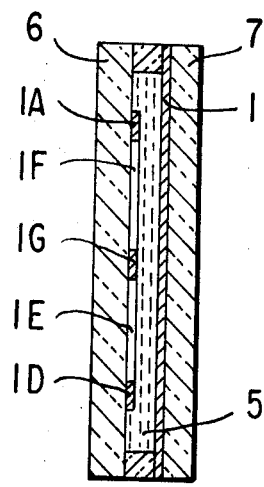
FIG. 2 is a cross section through one of the indicators.

FIG. 1 illustrates a four digit numeric indicator panel useful, for example, for watches, calculators and the like. Each indicator includes seven segments such as 1A, 1B, 1C, 1D, 1E, 1F and 1G and each also includes a backplate, such as 1. Liquid crystal 5, shown in the cross-section of FIG. 2, is located between the seven segments on the one hand the backplate on the other hand. The liquid crystal preferably is of the nematic type which operates on the principle of dynamic scattering. The seven segments are formed of transparent conductors and the backplate, in the case of a transmission type indicator, is also formed of a transparent conductor but in the case of a reflecting type indicator, is formed of reflecting conducting material.

The seven segments of an indicator are located on the inner surface of a transparent element such as glass plate 6. Similarly, the backplate is located on the inner surface of a glass plate such as 7. The thickness of the liquid crystal layer is a matter of engineering design and is one factor (there are also others) which determines, among other things, the amplitude of the exciting voltage required for causing the liquid crystal to scatter light.

In an arrangement of the type shown in FIGS. 1 and 2, in the interest of being able to simplify the logic and to reduce the number of drive circuits and the number of leads extending from the panel to the circuits for driving the segments, it is desirable to excite only one indicator at a time. If the indicator is placed in the on condition for a sufficient interval of time and this excitation recurs at a sufficiently high rate, the normal relaxation time of the material and the presistence of vision are such that the indicator will appear to remain on (the liquid crystal will appear to remain in its light scattering condition) in between excitation intervals.

Figure 3:
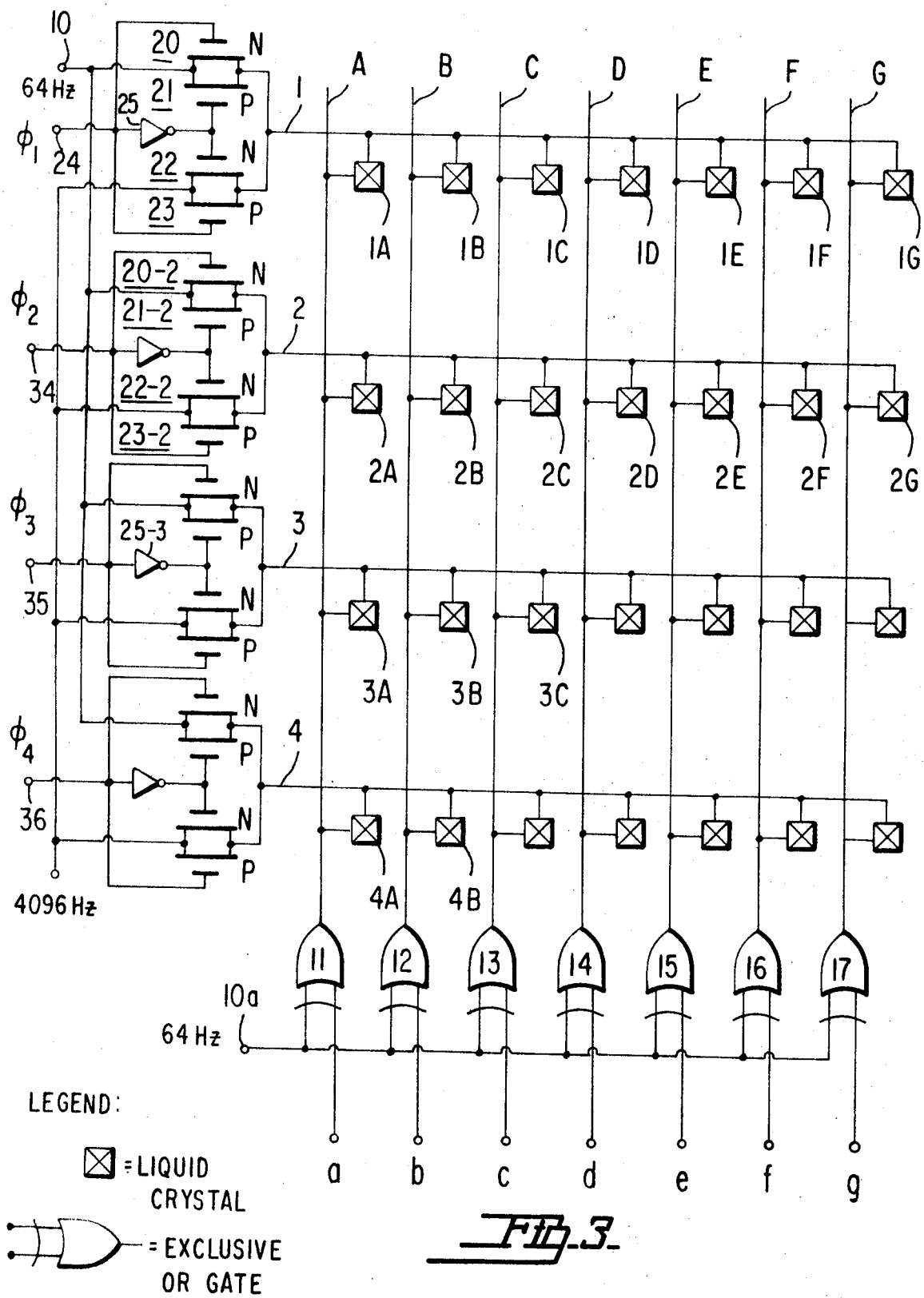
FIG. 3 is a schematic drawing of how the four indicators of FIG. 1 may be interconnected in a matrix in accordance with the teachings of the present invention.

FIG. 3 shows how the segments may be interconnected to achieve the results above. Each row of the matrix shown consists of one of the indicators. The row conductors correspond to the four backplates 1 through 4 and are similarly legended. The A segments of all four indicators are connected to a common conductor, the A column conductor of FIG. 3. Similarly, the B segments are connected to a common conductor — the B column conductor, the C segments to the C conductor and so on. The liquid crystal elements at the intersections of the rows and columns are identified by the row and column numbers. For example, the elements in row 1 are 1A, 1B, 1C and so on and the elements in column 1 are 1A, 2A, 3A and so on, all corresponding to like legended elements of FIG. 1. Each element consists of a volume of liquid between a segment and the backplate and its equivalent circuit would be a relatively high value of resistance, and a relatively low value of capacitance associated with the resistance.

EXCLUSIVE OR gates 11–17 are connected one to each column. Each such gate receives at one input terminal the 64 Hertz (Hz) unipolarity alternating driving voltage applied to terminal 10a and receives at its other terminal a segment control voltage — the voltages *a* through *g*, respectively. The unipolarity driving voltage varies in amplitude between two levels such as zero voltage representing binary 0 and +15 volts representing binary 1. The control voltages *a* through *g* are direct voltage levels which have a value of zero volts or +15 volts.

A group of two dual transmission gates connects to each row of the array. As the groups are identical, only the group for row 1 will be described. Each dual transmission gate consists of an n-type metal-oxide-semiconductor (MOS) transistor such as 20 and a p-type MOS transistor such as 21. The gate electrode of the n-type transistor 20 and of the p-type transistor 23 are connected to terminal 24. A character select signal $\phi_1$ is applied to this terminal. This character select signal is also applied via logical inverter 25 to the gate electrodes of p-type MOS transistor 21 and n-type MOS transistor 22.

The same 64 Hz exciting voltage as applied to terminal 10a is applied also to terminal 10. This latter terminal connects to one end of the parallel connected transmission paths of n-type transistor 20 and p-type transistor 21. A 4,096 Hz erase voltage is applied to one end of the parallel connected transmission paths of n-type MOS transistor 22 and p-type MOS transistor 23. The other end of these parallel connected transmission paths is connected to row 1. Similarly, the corresponding end of the parallel connected transmission paths of transistors 20 and 21 is connected to row 1.

As mentioned above, the $\phi_1$ character select voltage is applied to terminal 24. This selects the first numeric indicator (the row 1 indicator). The $\phi_2$ character select voltage is applied to terminal 34 for selecting the second indicator, that is, the indicator of row 2 and similarly the $\phi_3$ and $\phi_4$ character select voltages are applied to terminals 35 and 36 for selecting rows 3 and 4, respectively.

Figure 4:
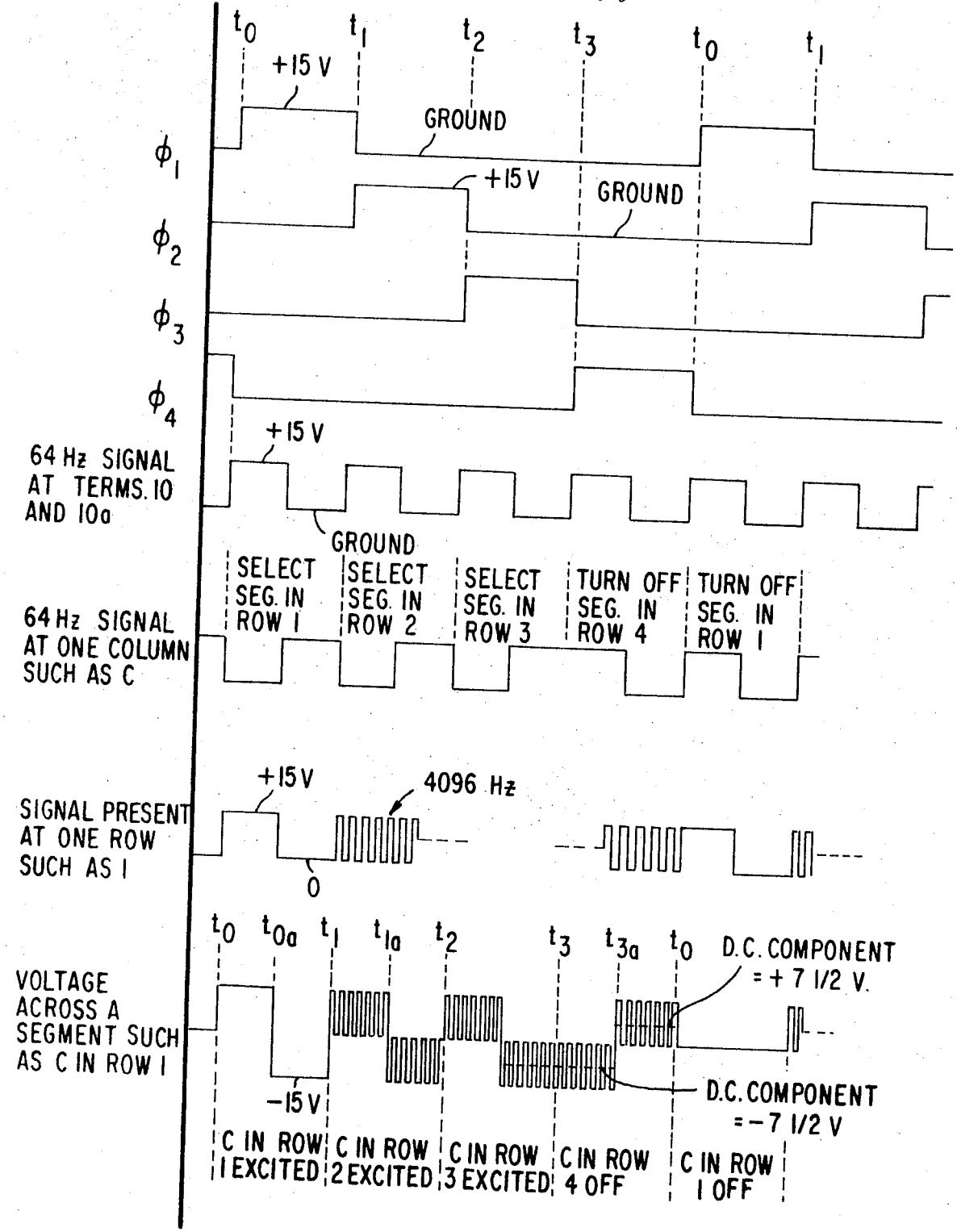
FIG. 4 is a drawing of waveforms to help explain the operation of the matrix of FIG. 3.

The operation of the circuit of FIG. 3 may be understood by referring both to FIG. 3 and to the waveforms of FIG. 4. During the period $t_0$ to $t_1$, the character select voltage $\phi_1$ is +15 volts representing binary 1. The character select voltages $\phi_2\phi_3$ and $\phi_4$ are at zero volts representing binary 0. The $\phi_1$ voltage is applied directly to the gate of n-type transistor 20 turning that transistor on and through inverter 25 to the gate of p-type transistor 21 turning that transistor on. Accordingly, the dual transmission gate 20-21 is on, and the unipolarity 64 Hz drive signal is applied through this gate to row 1.

The $\phi_1$ signal is also applied to the gate of p-type transistor 23 turning that transistor off and through inverter 25 to the gate of n-type transistor 22 turning that transistor off. Accordingly, the dual transmission gate 22-23 is off and the 4,096 Hz erase signal is prevented from being applied to row 1.

The situation is just the reverse of the above at rows 2, 3 and 4. For example, at row 2 the $\phi_2$ character select signal is at zero volts. This causes the dual transmission gate 20-2, 21-2 to be off and the dual transmission gate 22-2, 23-2 to be on. Accordingly, the 4,096 Hz erase signal is applied through the dual transmission gate 22-2, 23-2 to row 2 and the off dual transmission gate 20-2, 21-2 prevents the 64 Hz exciting voltage from being applied directly to row 2. In similar fashion, the 4,096 Hz erase voltage appears at rows 3 and 4.

An EXCLUSIVE OR gate, as is well understood in the art, produces a 1 output (an output signal representing binary 1) when one of the input signals represents a 1 and the other represents a 0 and produces a 0 output if both input signals represent 1 or if both input signals represent 0. Assume, for example, that the segment control voltage $a$ represents a 1 (is +15 volts). In this case when the 64 Hz signal represents a 1, the EXCLUSIVE OR gate 11 produces an output representing a 0 and when the 64 Hz signal represents a zero the EXCLUSIVE OR gate 11 produces an output representing a 1. In other words, when a segment control voltage such as $a$ represents a 1, the EXCLUSIVE OR gate produces an output complementary to the 64 Hz square wave it receives. It can also be shown that when a segment control voltage such as $a$ represents a 0, the EXCLUSIVE OR gate produces an output which is the same as, that is, which is in phase with, the 64 Hz signal applied to the second input terminal to the EXCLUSIVE OR gate.

In operation, the segment control voltages $a$ through $g$ applied to the EXCLUSIVE OR gates are made to have values to turn on those segments of the indicator selected corresponding to the number it is desired to display. For example, if it is desired to display the number 3 when the row 1 indicator is selected, then segments A, B, C, D and G must be turned on and segments E and F must be turned off. This operation is achieved by causing the segment control voltages $a$, $b$, $c$, $d$ and $g$ to have a value representing binary 1 (+15 volts) and the two remaining control voltages $e$ and $f$ to have a value representing binary 0 (0 volts). In the first case, that is, for example, when the control voltage $c = 1$ and when row 1 is selected, the 64 Hz signal appearing at column C will be complementary to the 64 Hz signal appearing at row 1. The situation will be that depicted in FIG. 4, during the first time interval $t_0$ to $t_1$, in the last four waveforms. The result, shown in the last waveform, is that for one half cycle $t_0 - t_{0a}$, 15 volts in one sense (+15 volts) appears across the crystal and for the other half cycle $t_{0a} - t_1$, −15 volts appears across the crystal. These voltage levels are sufficient to cause the liquid crystal to scatter light. The application of voltages in this way is "push-pull" excitation of the liquid crystal element and achieves the effect of bipolar alternating voltage (positive and negative half cycles) excitation and there is zero average current through the liquid crystal.

If it is desired not to select a segment of a selected indicator, the segment control voltage is made to be zero. For example, suppose the control voltage $f = 0$ during the time the 64 Hz signal appears at row 1. In this case, the 64 Hz signal appearing on column F will be in phase with the 64 Hz signal at row 1 and the net voltage appearing across the liquid crystal element 1F will be zero. The situation will be similar to that depicted in the last four waveforms of FIG. 4 during the second $t_0$ to $t_1$ period. This can be considered as "push-push" operation with the actual voltage across the liquid crystal zero as shown in the last waveform during the second period $t_0 - t_1$.

Summarizing the above, when an indicator is selected, any particular segment of the indicator may be either "on" (light scattering occurs at the segment location) or off (no light scattering occurs at the segment location). When a segment is on, a 15 volt unipolarity alternating voltage is applied across the crystal in push-pull. In other words, the effect achieved is that of a 30 volt peak-to-peak bipolar alternating voltage with average direct current through the liquid crystal zero. When a segment of a selected indicator is not selected, the 15 volt unipolarity signal is applied across the liquid crystal in push-push so that zero volts (both alternating and direct) appears across the liquid crystal.

When an indicator is not selected, then a 4,096 Hz unipolarity voltage appears across the liquid crystal in the manner illustrated at the bottom of FIG. 4. Assume, for example, that the indicator of row 2 is selected, that the indicator of row 1 is not selected, and that the C segment 2C of row 2 is selected — is on. The situation now will be as depicted in the time period $t_1$ to $t_2$ of the last waveform of FIG. 4 which illustrates the voltage across liquid crystal element 1C of a non selected indicator.

The voltage present at row 1 is the 4,096 Hz erase signal. The voltage present on column C is the 64 Hz signal which is out-of-phase with the 64 Hz signal at terminal 10a. During the time column C is at zero volts, row 1 will vary in amplitude between zero and +15 volts at the 4,096 Hz rate as shown for the first half $t_1$ to $t_{1a}$ of the time period $t_1$ to $t_2$. During the time column C is at +15 volts, the voltage at row 1 will vary between zero and +15 volts at the 4,096 Hz rate to produce across the liquid crystal element 1C the voltage shown during the last half $t_{1a} - t_2$ of the period from $t_1$ to $t_2$.

The 4,096 Hz frequency is in the "erase" voltage freqency range, that is, it tends to cause the liquid crystal to assume a non-light scattering condition.

According to one theory, the ions which would tend to cause turbulent motion of the liquid crystal domains, cannot travel any great distance in a rapidly alternating field. Instead, they oscillate aournd an equilibrium position moving only a very small distance each half cycle without substantially disturbing the liquid crystal domains. However, as the voltage across the liquid cyrstal during the period, for example, of $t_1$ to $t_{1a}$ is a 0 to 15 volt unipolarity alternating voltage signal, it develops across the liquid crystal a direct voltage component of +7½ volts amplitude. This direct voltage component would tend to cause light scattering if of sufficient amplitude (say greater than 10 or so volts) but is chosen to be lower than the threshold for light scattering for the liquid crystal so that light scattering does not occur. As already mentioned, the threshold for light scattering depends upon such parameters as the thickness of the liquid crystal layer the liquid crystal material and so on and appropriate voltages can be chosen to make the average direct voltage level lower than this threashold.

One problem still remains and that is that the average direct voltage level of +7½ volts, if not compensated for, would tend to lessen the life of the liquid crystal. But the present arrangement does provide such compensation. Note that in the following period $t_{1a}$ to $t_2$ the effect achieved is that of a voltage across the liquid crystal which varies in amplitude from zero volts to −15 volts at a 4,096 Hz rate. Here, the direct current component through the liquid crystal is −7½ volts. This −7½ volts direct voltage across the liquid crystal during the period $t_{1a}$ to $t_2$ is exactly equal to and opposite in sign to the +7½ volt direct voltage component across the liquid crystal during the equal period $t_1$ to $t_{1a}$. Accordingly, for the entire period $t_1$ to $t_2$ the average direct voltage level across the liquid crystal is zero.

The description above is for the case in which there is a segment in a non-selected row which is being erased at the time that a corresponding segment (one in the same column) in a selected row is being excited. The time period $t_3$ to $t_0$ in the last waveform illustrates the case in which the C element 1C in row 1 is being erased at the same time the C element 4C of the selected row 4 is being maintained in the off condition. Here, the situation is exactly the same as the situation for element 1C during the period $t_1$ to $t_2$ except that the phasing is different. During the period $t_3$ to $t_{3a}$, the average direct voltage level across liquid crystal element 1C is −7½ volts whereas during the second half of the period, that is, $t_{3a}$ to $t_0$, the average direct voltage level across the liquid crystal is +7½ volts. The net direct voltage level across the liquid crystal for the entire period $t_3$ to $t_0$ is zero volts.

Summarizing the above, any element for a non-selected indicator, that is, for a non-selected row has continuously applied thereto a 4,096 Hz signal. In terms of the indicator of FIG. 1, this signal is applied to the backplate. During one half of each indicator non-select period, an average dc level of +7½ volts appears across the segment of a non-selected row and during the other half period the average dc level across such a segment is −7½ volts. The average dc level therefore for the entire period is zero volts. For proper operation, the +7½ volt component (and the −7½ volt component) should be lower than the threshold voltage for light scattering for the liquid crystal.

Summarizing the overall operation of the system, with an arrangement such as described, the four indicators shown in FIG. 1 may be operated in multiplexed fashion, that is, one indicator is turned on at a time. The turn-on period (the time the liquid crystal is in its light scattering state) should be sufficiently long and the interval between turn on periods sufficiently short and flicker is minimized. This is a matter of engineering design.

The arrangement of the present invention has the advantage that the number of output leads from the indicator panel of FIG. 1 is reduced. Note that there are a total of 28 segments and four backplates and these are arranged in such a way (shown in FIG. 3) that only 11 leads for the entire panel (seven columns and four rows) are needed.

While for purposes of illustration, the invention is shown to be operated with one cycle of the 64 Hz signal per character select interval (the interval of the positive-going part of a wave such as $\phi_1$) the invention is not restricted to this mode of operation. For example, the timing may be such that two or more cycles of the exciting voltage appear during each indicator selection interval. It is also to be understood that while specific numbers are given in the present application by way of example, the invention is not limited to these specific parameters. As examples, the exciting voltage can be substantially lower than 64 Hz and can also be substantially higher than 64 Hz. Similarly, the erase voltage can be higher or lower than approximately 4 KHz. These voltages, while shown to be square waves, can instead be unipolarity alternating voltages of other shapes. Similarly other voltage values such as 0 and −15 volts can be used instead of 0 and +15 volts. It should also be noted that in the present arrangement the high frequency voltage, which in practice is derived from the same oscillator as the low frequency exciting voltage, is at a frequency which is an integral multiple of the low frequency voltage.

In the discussion above of the high frequency operation of a liquid crystal element, the two periods such as $t_1$ to $t_{1a}$ and $t_{1a}$ to $t_2$ are stated to be of equal duration and the direct voltage components produced are of equal amplitude but opposite sign. The result for the overall period such as $t_1$ to $t_2$ is a direct voltage component of average value zero. It is also possible to operate the system in such a manner that the two periods above are unequal. For example, the period $t_1$ to $t_{1a}$ may be shorter than the period $t_{1a}$ to $t_2$. In this case the high frequency voltage should be of higher amplitude during the shorter period and of lower amplitude during the longer period again with a view to obtaining an average direct voltage for the entire period of zero.

In some of the claims which follow, the liquid crystal elements are stated to be a matrix of such elements arranged in columns and rows. It is to be appreciated that this is not intended to be limited to a physical arrangement of elements in columns and rows and in fact, as is clear from the drawing, in the particular embodiment of the invention illustrated, the segments are not physically arranged in columns and rows. The meaning intended is that the liquid crystal elements are electrically interconnected in a matrix type arrangement. It is also clear that while a panel having four numeric indicators is shown, the invention may be practiced with two, three or a number greater than four of such indicators.

What is claimed is

1. In combination:
a liquid crystal element;
means for selecting said element during one time period comprising means for applying a relatively low frequency alternating exciting voltage across said element during said time period for causing said element to scatter light; and
means for placing said element in a substantially non-light scattering condition comprising means for applying to said element during one portion of another time period a relatively high-frequency, unipolarity voltage in a sense to produce an average direct-voltage level of one polarity across said element and for applying to the element during a following portion of that other time period a relatively high-frequency, unipolarity voltage in a sense and amplitude to produce an average direct-voltage level of opposite polarity across the liquid crystal and at a level such that the average direct voltage level across the element for the two portions of said other time period is substantially zero.

2. In the combination as set forth in claim 1, said last-named means comprising means for producing direct voltage levels across said liquid crystal element whose value does not exceed the voltage threshold for light scattering for the liquid crystal element.

3. In the combination as set forth in claim 1, said first-named means producing a square wave and said second-named means producing square waves.

4. In the combination as set forth in claim 1, said last-named means comprising means for applying said unipolarity voltages to said element during equal time periods and at the same level of amplitude.

5. A method for maintaining a two terminal liquid crystal element in a substantially non-light scattering condition comprising, in combination;
applying to one of said terminals a relatively low-frequency, unipolarity alternating voltage having equal interval excursions of opposite sense;
applying to the other of said terminals a relatively high-frequency, unipolarity alternating voltage, in a frequency range above that at which light scattering occurs, and at an amplitude level such that the direct current component across the liquid crystal is lower than the voltage threshold level for light scattering from the liquid crystal.

6. The method as set forth in claim 5 wherein the relatively low and relatively high frequency voltages applied to the respective terminals are square-wave signals.

7. In combination:
a matrix of liquid crystal elements arranged in columns and rows;
means for applying to a selected row of the matrix a unipolarity alternating voltage in a frequency range at which light scattering from the elements can be achieved;
means for applying to all columns of the matrix a unipolarity alternating voltage at the same frequency as the voltage applied to said selected row and which, at a particular column, may be in phase with or substantially 180° out-of-phase with the voltage at said selected row; and
means for applying to all remaining rows a relatively high frequency unipolarity alternating voltage in a frequency range above that at which light-scattering occurs.

8. In the combination as set forth in claim 7, said means for applying to a selected row of the matrix a unipolarity alternating voltage comprising a dual, metal-oxide-semiconductor transistor transmission gate.

9. In the combination as set forth in claim 7, each row of said matrix comprising a numeric indicator having a backplate, a number of segments equal to the number of columns of th matrix and liquid crystal located between the backplate on the one hand and the segments on the other hand said backplate serving as the row, and each segment being connected to a different column.

10. In the combination as set forth in claim 8, said means for applying to all remaining rows a relatively high frequency unipolarity alternating voltage comprising a plurality of dual, metal-oxide semiconductor transistor transmission gates, one dual gate for each said row, and means for turning these gates on concurrently with the turn on of the dual transmission gate of claim 8.

11. In the combination as set a ale in claim 7, said means for applying to all columns of the matrix a unipolarity alternating voltage comprising a plurality of EXCLUSIVE OR gates, one connected to each column, means for applying to all gates an alternating voltage which varies in value beeen levels representing binary 0 and binary 1, and means for individually applying to said gates a direct control voltage which, in each case, may have a value representing either binary 0 or binary 1.

12. In combination:
a liquid crystal element;
means for applying a relatively low frequency alternating voltage across said element during one time period; and
means for applying to said element during one portion of another time period a relatively high-frequency, unipolarity voltage in a sense to produce an average direct-voltage level of one polarity across said element and for applying to the element during a following portion of that other time period a relatively high-frequency, unipolarity voltage in a sense and amplitude to produce an average direct-voltage level of opposite polarity across the liquid crystal and at a level such that the average direct voltage level across the element for the two portions of said other time period is substantially zero.

* * * * *